United States Patent [19]
Goudikian

[11] 3,940,570
[45] Feb. 24, 1976

[54] APPARATUS FOR COMBINING A CENTRAL TELEPHONE TRUNK LINE WITH A CUSTOMER TELEPHONE TRUNK LINE

[75] Inventor: Edward Goudikian, Commack, N.Y.

[73] Assignee: Tele-Assemblies, Farmingdale, N.Y.

[22] Filed: Aug. 5, 1974

[21] Appl. No.: 495,079

Related U.S. Application Data

[63] Continuation of Ser. No. 167,418, July 29, 1971.

[52] U.S. Cl............................................ 179/18 AH
[51] Int. Cl.[2]......................................... H04M 7/14
[58] Field of Search ........ 179/18 AD, 18 AH, 16 E, 179/16 EC, 16 A, 27 CA

[56] References Cited
UNITED STATES PATENTS

| | | | |
|---|---|---|---|
| 3,156,775 | 11/1964 | Ioakimidis et al. ............. | 179/16 EC |
| 3,221,108 | 11/1965 | Seemann et al. ................ | 179/27 CA |
| 3,715,513 | 2/1973 | Miller............................. | 179/18 AD |

*Primary Examiner*—Thomas W. Brown

[57] ABSTRACT

A system for combining a central telephone trunk line with the trunk line of a customer exchange wherein said central telephone exchange is provided with means for separating the dial, talk, and ring functions into a first partial circuit for providing a service signal to and from said customer trunk line, and a second partial circuit for providing a ring signal to said customer trunk line, an interface device comprising a first circuit controlling the power feed, ring trip and dial pulse of said customer exchange and a second circuit controlling the ring signal from said telephone exchange. The first circuit of said interface system includes a first relay activated by said customer trunk line having a contact located in said first partial circuit responsive to said activation for closing said first partial circuit to establish service with said telephone exchange trunk line. The first relay has at least two windings and a single core, said relay being operable by a current through either of said windings, one of said windings being connected between a DC battery source of power and one lead of said customer trunk line, the other of said windings being connected between ground and the other lead of said customer trunk line, said relay being operable on looping of the leads of said customer trunk line and on grounding of said, one of said leads. A second relay located in said second partial circuit is activated by a ring pulse in said telephone exchange trunk line, said second circuit of said interface system including a contact movable by said second relay to connect said customer trunk line to an AC source of ringing current.

5 Claims, 3 Drawing Figures

APPARATUS FOR COMBINING A CENTRAL TELEPHONE TRUNK LINE WITH A CUSTOMER TELEPHONE TRUNK LINE

This is a continuation of Ser. No. 167,418, filed July 29, 1971

BACKGROUND OF THE INVENTION

The present invention relates to interface systems for connecting telephone company voice connecting arrangements to customer owned loop or ground start trunk PABX or key systems.

Until recently the installation of customer owned equipment on customer's premises by the customer was unlawful. It was necessary for the customer to contract with the local telephone company or common carrier for installation of all internal equipment. Recently Federal Tariff Regulations have been amended and customers have been allowed to install their own equipment and to connect it with the telephone company's local and country wide systems. Current regulations now provide that the telephone company supply only a voice connecting arrangement (sometimes referred to as VCA units), by which the talk, dial and ring functions are separated for safety; to which the customer installs an interface or intermediate unit connecting the PABX system or Key system to it. The interconnect interface unit is intended to safeguard the operating conditions of the telephone company system against excess power, and cross switching defects.

It is the object of the present invention to provide an interface device for joining customer owned systems with standard telephone systems.

It is another object of the present invention to provide an interface device which simplifies the installation of PABX, Key or other customer owned systems with local telephone connecting systems.

It is yet another object of the present invention to provide an interface unit which protects and safeguards telephone and customer equipment.

These objects as well as other together with numerous advantages will be seen from the foregoing description of the present invention.

SUMMARY OF THE INVENTION

According to the present invention an interface system is provided for combining a telephone exchange trunk line and a customer provided trunk line comprising a first circuit controlling the power feed, ring trip and dial phase of said customer exchange and a second circuit controlling the ring signals from the telephone exchange. The circuits are connected between the trunk lines to selectively enable the telephone exchange and the customer to establish two way voice communication.

In the system a pair of relays are used with V.C.A. units with which the ringing, dialing and talk functions have been separated from the trunk line and recombines wires associated with each of the functions so as to enable sequential operation and proper functioning for each trunk connection. The battery power source may be 24 or 48 V and the trunk line connections may be ground start or loop start as the common carrier may require.

Full details of the present invention are disclosed in the following description and in the attached drawings.

DESCRIPTION

Figure 1:
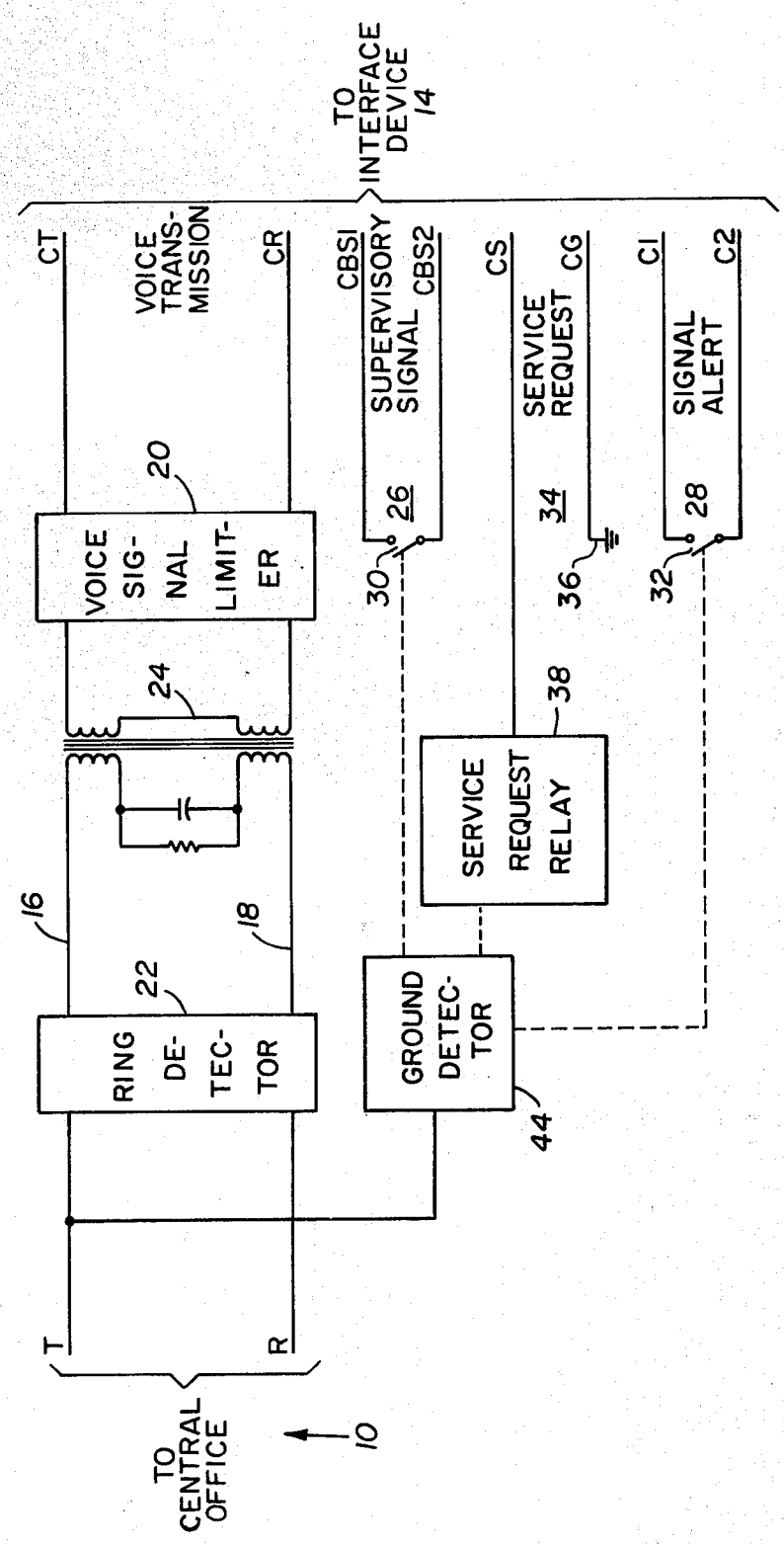
FIG. 1 is a circuit diagram of a VCA unit.

Turning to FIG. 1, a typical voice connecting arrangement (V.C.A.) installed by the common carrier local telephone company is shown. The telephone company provides various VCA systems for a variety of functions; all, however, whether called CED, CD or CD through CD9 etc. operate in basically the same manner and separate the ring, dialing and talking functions from the trunk line. The V.C.A. unit is generally installed on the customers' premises and is intended as a block between the nearest telephone exchange office, defined by the numeral 10 and the customer's equipment such as a PABX or key system, defined by the numeral 12 in FIG. 2. As seen in the drawings the V.C.A. unit is shown only schematically and in its simplest form as controlling a single telephone company trunk line and a single PABX trunk line via an interface device 14. The V.C.A. arrangement is designed to handle communication in both directions through transmission lines 16 and 18 and includes a voice signal limiter 20, a ring detector 22 and a signal transformer 24 by which the transmitted voice signals are controlled.

The customer's end of the V.C.A. is provided with a pair of partial circuits 26 and 28 for supervisory and signal alert functions respectively. Each of the partial circuits includes a normally open switches 30 and 32 and a pair of terminals; terminals CBS 1 and CBS 2, being associated with contact 30 while C1 and C2 are associated with contact 32. A third partial circuit 34 for service request function is also included in the V.C.A. and comprises a ground lead 36, a low voltage (24V) service request relay system 38 and a pair of terminals CS and CG. The terminals CBS 1, CBS 2 C1, C2, CS and CG are all mounted on a connecting block 42. The transmission line leads 16 and 18 also terminate in block 42 as connector terminals CR and CT. The telephone exchange end of the V.C.A. unit is provided with a ground detector and supervisory circuit relay system 44 by which the telephone exchange controls these circuits and the contacts.

Suitable relay contacts interconnect the service request relay 38 and the ground detector relay 44 for cooperative action on outgoing calls while similar relay contacts interconnect the ground detector 44 and the supervisory contact 30 on incomming calls.

Briefly the V.C.A. unit operates so that when the customer requires service the contacts CS and CG are closed or looped in a manner to be described later. The relay 38 is then activated, alerting the telephone exchange or service. The response of the telephone exchange, is obtained through the detector and supervisory relay 44 which causes closing of relay contact switch 30 transmitting the response through supervisory leads CBS 1 and CBS 2 to the customer. This condition of the telephone company trunk line via the transmission leads 16 and 18 will maintain the relay contact 30 closed so long as the V.C.A. is connected to the central office. The telephone company trunk line is released only on termination of a call when the customer opens the contacts of the service request circuit, as by going on-hook. This causes a disconnect signal, via service request relay 38 to be transmitted to the telephone exchange.

In reverse, to reach the customer from the outside, the telephone exchange applies a ring to the signal alert circuit via the ring detector by closing switch 32 passing a signal via the C1 and C2 terminals. The customer's PABX attendant answers by closing the service request circuit 34. The system then acts in the manner aforedescribed. The PABX attendant disconnects by opening the service request while the telephone exchange disconnect by opening the switch 30 of the supervisory circuit 26.

Two types of systems are employed by the telephone company to start operation as by going off-hook or by ringing in. Namely, the operation may be initiated by a ground start contact in which the circuit effect is started by a surge of power through a ground connection, or by the loop condition in which the circuits are prelooped so that immediately upon off-hook or ringing-in the circuit is initiated. The above described device is suitable for both. For loop start the ground detector and supervisory contacts CBS 1 and CBS 2 and contact 30 may be omitted.

The above V.C.A. unit and its operation is more fully described in the Bell System Voice Communications Technical Reference entitled "Voice Connecting Arrangement, CED," published by the American Telephone and Telegraph Company, 1970. Reference can be made to this document which is incorporated herein by reference for further details if required. It is readily available through the Engineering Director, Customer Telephone Systems, 195 Broadway, New York, N.Y. 10007.

Figure 2:
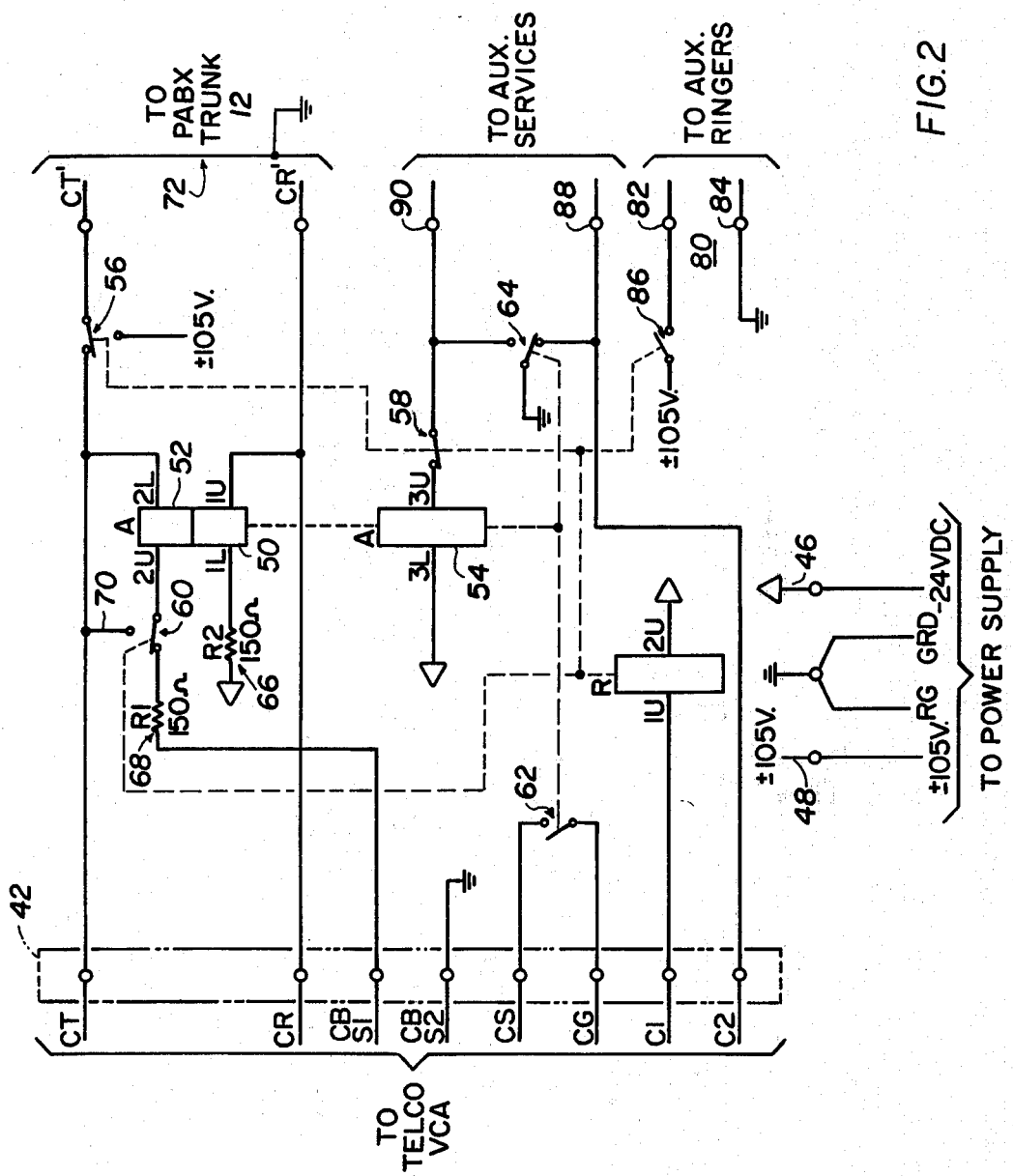
FIG. 2 is a circuit diagram of an interface unit according to the present invention.

As seen in FIG. 2, the interface unit 14 shown is adapted for operation under 24V DC battery power source 46, and 105V AC current ring source 48. The interface unit comprises a pair of relays A and R. The A relay is a one core three winding device adapted to provide battery feed, ring trip and dial pulse reaction incorporated in the signal alert function. Activation of any one of the coils of the A relay will operate the relay. The R relay is a single core-single winding device adapted to transmit the ringing signal to the customer. A common ground as by connection to frame or cabinet is provided for both the AC and DC power sources. The common ground is necessary for both the 24V and 105V power sources to provide automatic ring trip.

The R relay is connected to the C1 terminal of the signal alert circuit and the 24 Volt-battery source 46. The A relay has one winding 50 connected between the CR' terminal and the battery source 46 via resistor R2; a second winding 52 connected between the CT' terminal and the CBS 1 terminal of the supervisory circuit via resistor $R_1$ and normally closed switch 60; and a third winding 54 connecting the battery source 46 and an open switch 64 connected to the C2 terminal of the signal alert circuit. The CBS 2 terminal is grounded.

The R relay has at least three switch contacts, each of which are early-make-break (EMB) switch contacts which are normally active in one circuit and shiftable into active condition as part of a second circuit. The first switch contact 56 is located to switch between the CT terminal and the terminal CT' of the PABX trunk and source 48 of 105 V.AC. The second switch contact 58 is connected in circuit to switch between the third coil 54 of the A relay and the C2 terminal via auxiliary services terminals 90 and 88. The third switch contact 60 is located to switch between the second coil 52 of the A relay and the CBS 1 terminal and the CT terminal.

The A relay has two switch contacts. One switch contact 62 is located in the CG and CS service request circuit. The other switch contact 64 is located in the line of the C2 terminal to switch a ground connection between the third coil of the A Relay and a terminal 88 of the auxiliary service which is part of the signal alert circuit. The switch contacts of the A relay are break-make (BM) contacts being normally out of circuit.

Located in series with the first winding 50 of the A relay is a resistor 66. A similar resistor 68 is located in series with the second winding 52. A short 70 junping the second contact of the R relay and the second winding 52 of the A relay is provided. The PABX trunk is schematically shown as being provided with a telephone set hook 72 which when off-hook loops R and T via terminals CR' and CT' so that voice communications can be had.

In the arrangement of FIG. 1 the system is ground start and consequently the R line is connected to ground when the hook 72 is off-hook (i.e. for outgoing calls) while T lead is connected to ground when the hook 72 is on-hook (i.e. for incoming calls).

In this circuit the A relay is XWJ - 16G unit, and the R relay is WK - 3G unit, both supplied by OK1 ok! The A relay operates on the impression of current through anyone of three of the windings which are respectively 100,100 and 300 ohms rated each. Both resistors are standard 150 ohm, 1 watt units.

Figure 3:
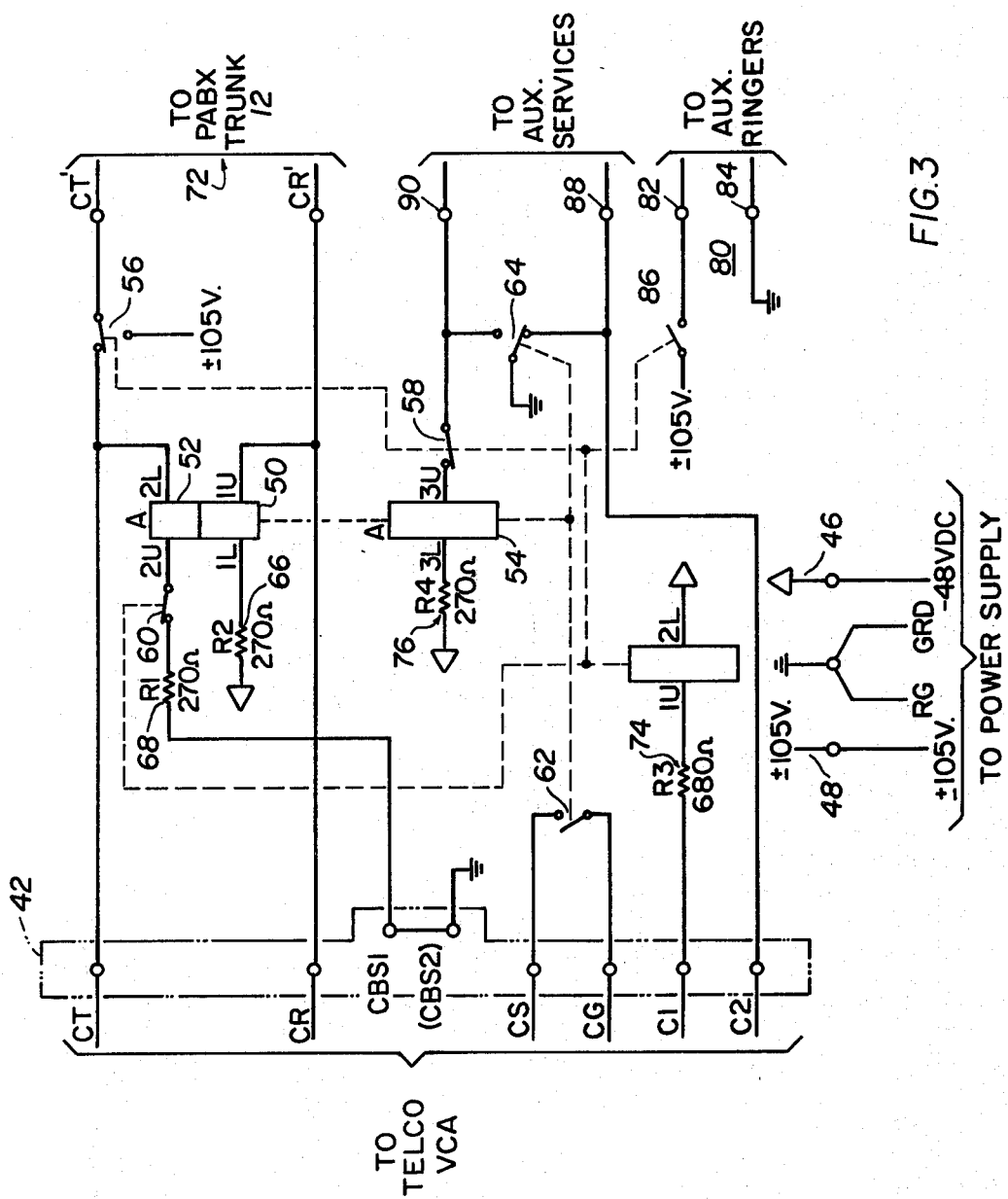
FIG. 3 shows variant embodiments of the interface unit of FIG. 2.

In FIG. 3 a similar circuit is shown for use with a 48 Volt power source. The circuit itself is the same, including the relays; however, the resistors are different and the short 70 is omitted. Here the resistors are both 270 ohm, 2 watt.

In addition, third and fourth resistors 74 and 76 are inserted between the C1 terminal and the winding of the A relay and the third winding of the A relay and the battery, respectively. The third resistor is 680 ohm 1 watt, while the fourth resistor is a 270 OHM 1 watt unit.

FIG. 3 also shows another variant which may be applied to either of the interface units when the PABX trunk terminal CR' and CT' are connected for loop start. As noted earlier, in loop start the CBS 1 and CBS 2 terminal are omitted. Therefore, in the interface unit of FIG. 3 a direct connection is made between the resistor 68 in the second coil of the A Relay line and the ground and the off-hook position of hook 72 affects a direct loop between the R and T leads.

In operation of the interface of either FIG. 2 or 3 when a customer wishes to dial out he lifts the hook 72 to the of-hook position. This immediately grounds the CR' lead completing a circuit through the first coil 50 of the A Relay with the battery via the resistor 66. The A Relay contacts instantaneously shift (the shift being measured in milli-seconds) closing contact 62 in the service request circuit 34. The completion of a circuit in the V.C.A. through terminals CS and CG activates the service request relay 38 activating the series of contacts connecting it with the ground detection relay 44. The ground detection relay passes a pulse to the telephone exchange advising the exchange of the desire to dial out from the PABX Unit. If a telephone company trunk line is available, the telephone exchange seizes the trunk and returns a ready signal to the ground detector 44. The ground detector 44 is connected to the switch contact 30 in the supervisory pair circuit 26 and closes it so that a circuit is completed between the ground, CBS 2, Contact 30, terminal CBS 1, resistor 68, the second coil 52 of the A Relay and the CT' lead holding the A Relay closed during subsequent operation. A dial tone or voice communication is then established in lines 16 and 18 to the CR' and CT' leads directly from the PABX unit to the telephone company trunk line. Dialing out is pulsed via the CR' lead.

On incoming calls from the telephone company trunk the circuit of FIG. 2 acts as follows. The initial ring is first of all sensed by the ground detection circuit which on incoming service acts as the signal to close the contact 30 in the supervisory circuit, completing the circuit of the CR' and CT' leads with the ground as previously described, except for the fact that hook 72 remains on hook and circuit is incomplete. Instantly thereafter the ring detector 22 in the VCA unit senses the telephone company ring pulse. The ring detector is provided with a relay which activates contact 32 in the signal alert circuit closing the same and completing a circuit via terminal C- and C2 across the winding of the R relay. Activation of the R relay shifts contact 56 connecting the CT' lead to the source of 105V current. Since in the on hook condition CT' lead is grounded via hook 72 a circuit is completed for bell ringing. Ringing continues in intervals determined by the pulse signal from the detector 44.

On ringing of the bell the PABX operator goes off hook completing the circuits via the A relay as aforedescribed signaling to the telephone exchange that receiption is ready and establishing voice communication over the CR and CT leads. Simultaneously, however, the R relay has also shifted its second contact 60 into the short circuit 70 about the second coil of the A relay. This shorting of the second coil 52 prevents the coil from establishing an inductive force on the first coil 50 of the A relay and neutralizes the effect of this coil or the A relay until the ringing pulses are stopped. Because the telephone company ring signal is in pulsing form the R relay pulses on and off to close contacts 56 and 60. Without the short the inductive force would create both a chatter or noise in the CR' and CT' communication leads and also create the possibility that the ring would be heard through the headset, being momentarily deafening to the outside customer. As soon as the PABX operator goes off hook a signal is passed to the ground detector 44 advising the telephone exchange to cease ringing. Once this occurs normal communication can take place between via pulsing closure of contacts 62 the lead CR' and CT' and CR and CT respectively. Also once the PABX operator goes offhook and circuits are completed through the A relay, the contact 64 of the A relay opens breaking ground connection of the C2 lead, releasing the R relay and thus completely tripping the ring as soon as a voice connection is made whether during the silent or ringing interval.

It will be observed that an important reason for the operation of this circuit lies in the use of the short 70 across the second winding. Also the fact that both the 24 V and 105 V sources are commonly grounded permits the same circuit components to function in two separate systems.

The circuit of FIG. 3 will operate in virtually the same manner. As far as the loop start is concerned the off-hook of hook 72 completes a circuit immediately between ground, the second winding 52 of the A relay, the leads CR' and CT', the first winding of the A relay and the battery. The CG, CS service request circuit is closed and the telephone exchange signal to provide or seize a trunk line as previously described. On incoming calls the ring detector 22 actuates the signal alert circuit 28 and the previous situation is repeated. In the loop circuit the ground detector — supervising circuit is omitted from the VCA unit. In the circuit of FIG. 3 the extra resistors 74 and 76 and the higher ohm value for resistors 66 and 68 serves to chain the higher power input from the 48 V DC source. Because of the higher power parameters, however, the creation of an inductive force between the first and second windings of the A relay is eliminated and therefore the short 70 seen in FIG. 2 is not needed in this embodiment.

Each of the circuits of FIGS. 2 and 3 are adaptable for a number of auxiliary service. The first being for the connection of auxiliary ringers, which can be placed remote from the PABX or answering extension. A circuit 80 is provided between a pair of terminals 82 and 84 in which a contact 86 being part of the R relay is inserted. Terminal 84 is connected to ground while the terminal 82 is connected to the 105V ring power source via the contact 86 so that on activation of the R relay by the signal alert circuit the auxiliary bell system would be caused to operate.

Other auxiliary devices may be connected to the C 2 — A relay circuit by tapping a pair of terminals 88 and 90 across the contact 64 activated by A relay. Such an auxiliary service for example can be a toll or call restrictor, permitting incoming calls during certain hours of the day. An external key may be provided across terminal 88 and 90 which may be closed as desired. This closure will act as an answering device upon receipt of an incoming call on the first receipt of a ringing signal. The A relay will then operate via the third winding 54 of the A relay in milliseconds preventing the ringing voltage from being applied to the PABX CR' and CT' leads. The circuit will response upon the onhook or release of the incoming calls.

It will thus be observed that the present system embodied in the devices shown easily and successfully recombines the pairs of talk, ring, and dial function wires separated by the telephone exchange making the telephone exchange compatible with customer key systems and PABX systems.

The system provides talking battery current for the customer. On outgoing calls it repeats dial pulses and supervisory signals. On incoming calls it transmits the ring signal and also prevents the signal from interfering with voice communication, by immediately tripping the ring when talk is established. Various telephone company V.C.A. units restrict the customer to only incoming calls. The present interface units may also be adapted to use interconnecting voice arrangements.

The interface units aforedescribed are adapted to control and operate a single trunk of the PABX or key systems. In the event multiple trunks are supplied the interface units are merely duplicated. The relays noted above, as being preferable, all have duplicate winding systems so that in certain instances the same relays may be employed in two independent interface systems. This provides an advantage in enabling space reduction and weight reduction while increasing service capacity.

Although FIG. 2 illustrates a 48V power source with a loop start system it will be obvious that the two are exchangeable for the 24V power source and ground start of FIG. 1. Thus a number of combination of systems and circuit parameters can be obtained as desired.

The present invention therefore provides a simple, effective, and economical means for connecting customer telephone systems with the local telephone company equipment. The present interfaces are adaptable to both the various customer systems as well as the various telephone systems. The circuitry is extremely simple, reducing the possibility of failure. Only two relays are used per trunk circuit. Pulse repetition is accurate and no false pulses are transmitted. Unlike known devices allegedly providing the same result the present device does not require a timing circuit to match with the V.C.A.

What is claimed is:

1. In a system for combining a central telephone trunk line of a central telephone exchange with the trunk line of a customer exchange having power feed, ring trip and dial pulse functions, wherein said central telephone exchange is provided with means for separating the dial, talk, and ring functions into a first partial circuit for providing a service signal to and from said customer trunk line, a second partial circuit for providing a ring signal to said customer trunk line, and a third partial circuit for voice transmission operable by completion of said first partial circuit, an interface system comprising a first circuit connected to said first partial circuit for controlling the operation of each of the power feed, ring trip and dial pulse of said customer exchange, a second circuit connected to said second partial circuit for controlling the ring signal from said telephone exchange, and a third circuit connected to said third partial circuit, a first relay located in a said second circuit having a winding connected between a DC source of current and ground, said first relay having a normally closed contact located in said third circuit operable on activation of said first relay to connect a lead of said customer trunk line to a source of AC ring current, a second relay located in said third circuit having at least two windings and a single core, said relay being operable by a current through either of said windings, one of said windings being connected between a DC source of current and one lead of said customer trunk line, the other of said windings being connected between ground and the other lead of said customer trunk line, said second relay having a normally open first contact in said first circuit operable on looping of said customer trunk line to complete said first partial circuit and establish service with said telephone exchange, and a normally closed second contact in said second circuit operable on looping of said customer trunk line to disconnect said first relay from said DC source of current and discontinue the AC ring current.

2. The system according to claim 1 wherein said other winding of said second relay is connected through the telephone exchange to ground on providing a loop closure in said telephone exchange.

3. The system according to claim 1 wherein said ground connections for the DC and AC sources are common.

4. The system according to claim 1 wherein said first relay includes a second contact bypassing said second winding of said second relay to short said second winding on activation of said first relay.

5. The system according to claim 1 wherein said second relay includes a third contact interposed between said source of ring current and at least one auxiliary bell to provide a ring signal remote from said customer exchange.

* * * * *